March 13, 1956 L. FAGO 2,738,028
LINT TRAP FOR LAUNDRY DRIER
Filed May 21, 1953

INVENTOR:
Louis Fago
BY
Milo B. Stevens & Co.
Attorneys.

United States Patent Office 2,738,028
Patented Mar. 13, 1956

2,738,028
LINT TRAP FOR LAUNDRY DRIER

Louis Fago, Chicago, Ill.

Application May 21, 1953, Serial No. 356,380

2 Claims. (Cl. 183—62)

My invention relates to laundry driers, and more particularly to the substances emitted from the discharge flue thereof. During the laundry-drying process, the main medium emitted from the drier is moisture. Also, when the clothes include flannels, cottons and loose materials, a tendency arises in them to give off lint, fluff and threads. Therefore, it is the custom to lead off the moisture, lint, etc., from the drier by way of a flue extending from the premises in which the drier is located to the outdoors. While the objectionable matter is thus removed from the premises, an annoyance is caused where a lawn or garden surrounds the premises. Such annoyance is in the form of the lint, fluff or threads being blown or deposited onto the lawn from the discharge flue of the drier. Some driers are equipped with a screen or similar device in the discharge flue to check or trap the objectionable material, but in due time the screen becomes clogged and obstructs the flow or circulation in the discharge flue. This condition not only impairs the efficiency of the drier, but tends to overheat the motor, so that the drier company is usually called upon to send out a service man to look into the difficulty. An incident of this kind therefore not only causes inconvenience to the user of the drier but a probable expense to the user or the company, all because the means for controlling the circulation in the discharge flue of the drier have proven deficient. In order to overcome this situation, it is one object of the present invention to provide a trap which intercepts the flow of solid matter through the flue while allowing ample room for the circulation of air and moisture therein.

A further object is to design the novel trap in the form of a series of screens which are primarily in the path of the solid matter, but staggered in order to permit air and moisture circulation therebetween and onward through the flue.

Another object is to construct the novel trap with a framework which supports the screens removably, in order that they may be cleaned from time to time.

An additional object is to form the trap as a unit interposed in the flue of the drier and requiring no alternation or special fittings for the installation of the unit.

A still further object is to mount the screens and their framework on a door forming a part of the trap unit, in order to render the screens easily removable by the simple opening of the door.

An important object is to construct the novel trap with the fewest number of parts consistent with efficient operation, and along lines of compactness and simplicity.

With the above objects in view, a better understanding of the invention may be had by reference to the accompanying drawing, in which—

Figure 1:
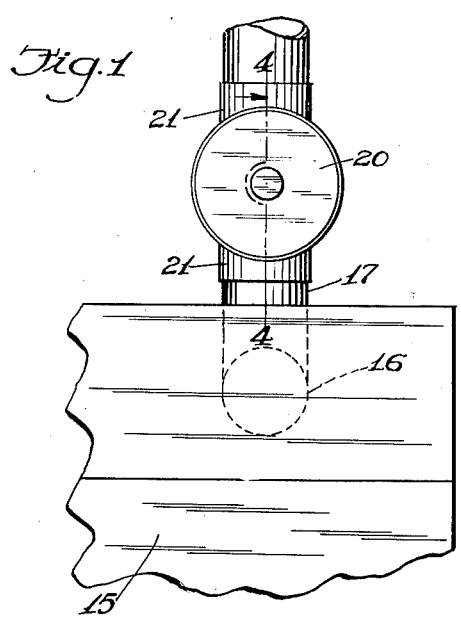
Fig. 1 is an elevation of one top corner of a typical laundry drier, showing the application of the novel trap thereto.
Figure 2:
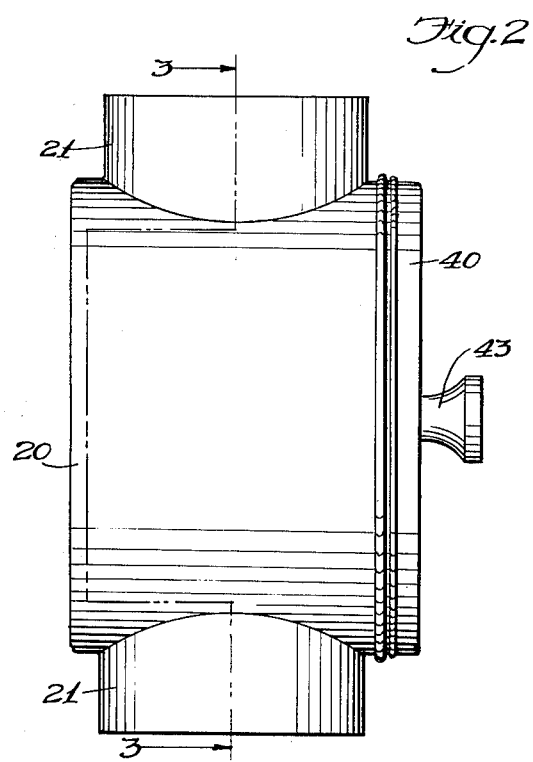
Fig. 2 is a view of the trap from the left-hand side of Fig. 1, and on an enlarged scale.

In accordance with the foregoing, specific reference to the drawing indicates the drier at 15. Usually, a rear duct 16 extends from the same for the discharge of moisture, lint, etc., such duct rising in the form of a flue 17. The novel trap 20 is in the form of a cylinder having tubular extensions 21 from the top and bottom; and the trap is interposed in the flue 17 by fitting the sections of the latter into the extensions of the trap, as shown in Fig. 1.

Figure 3:
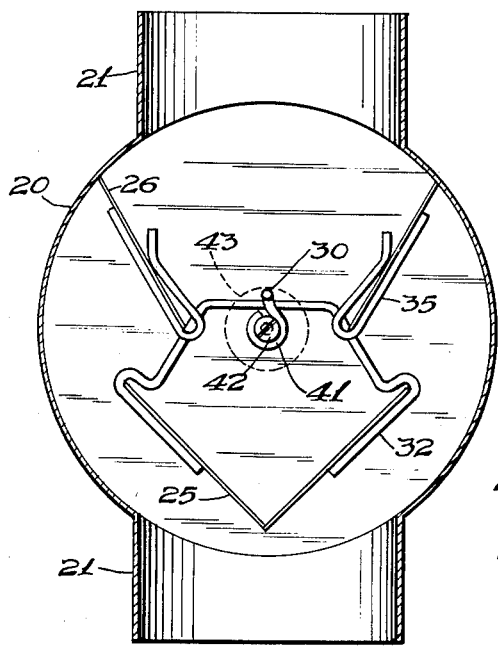
Fig. 3 is a section on the line 3—3 of Fig. 2.
Figure 4:
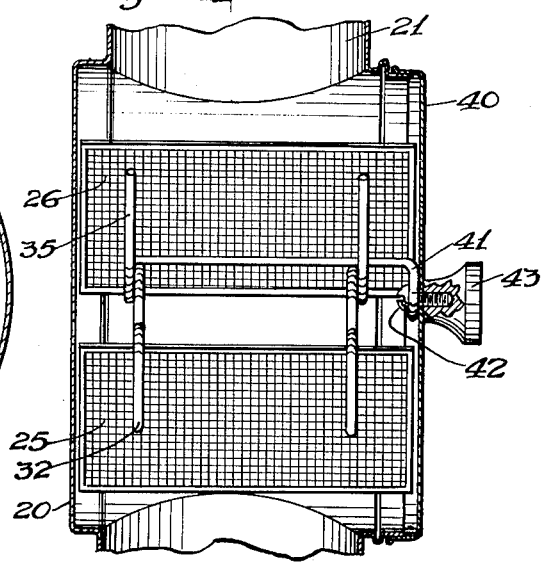
Fig. 4 is an enlarged section on the line 4—4 of Fig. 1.

Two forms of screens are disposed in the trap for intercepting the solid materials rising into the same from the drier. A primary screen 25 is V-shaped, as shown in Fig. 3, and situated in the lower part of the trap so as to be directly in the path of the rising solid matter. With the screen 25 as wide as or wider than the flue 17, it may be assumed that the direct flow of solid matter will be intercepted by this screen alone. However, if some solid matter bypasses the screen 25, two secondary screens 26 are employed in the upper part of the trap to check such solid matter as rises into the same. These screens converge from the upper part of the trap in downward direction to widely spaced points in the center, so that the screens 26 occur in spaced overlapping relation relative to the sections of the screen 25. It is now apparent that a considerable space exists between the upper and lower screens of the trap, so that the circulation of air and moisture through the same will not be impaired even if both sets of screens are badly clogged with solid matter. It should be noted that the flow from the drier has sufficient force to project such solid material against the screens 26 as slides off the screen 25. The air accompanying such solid material will also pass through the screens 26 as long as these do not become clogged, but will move into the center of the trap more and more as the screens 26 tend to clog, maintaining the circulation through the trap.

A frame of sturdy wire rod material 30 is employed for the support of the screens 25 and 26. Thus, the frame is extended with lower receptacle rods 32 to receive and support the screen 25 between them, and with upper receptacle rods 35 to receive and support the upper screens 26. Both sets of screens may be mounted in their respective receptacles by simply sliding them into the same from the rear.

While the trap cylinder 20 is closed in the rear, it is open in front to receive a door 40; and the frame 30 is formed with a frontal eye 41 applied to the inner side of the door and receiving a bolt 42 in order to connect the frame 30 for support from the door. The latter receives a center knob 43 in front into which the bolt 42 is threaded to secure both the frame 30 and the knob 43 to the door.

When an installation of the new trap is made, a directive is given to clean the same from time to time, such as after each wash has been dried. In the present case, this directive may be followed without concern as to any impairment of the drier function or equipment, since even the complete clogging of the screens will not affect the operation of the drier. However, if the screens are cleaned from time to time, they will serve efficiently to trap all lint and other solid matter rising in the drier flue, so that none is carried out of the premises to cause a nuisance or annoyance.

It will now be apparent that the novel trap is a piece of equipment which will operate efficiently without undue care or attention, and which at no time imposes any retarding or harmful influences on the drier. Further, the trap is in the form of a unit which is easily installed in the flue of the drier without any special tools or attachments. Further, the screen assembly may be quickly removed for full inspection and cleaning access by simply opening the door of the trap. Finally, the trap is composed of few parts and is of a nature to be produced at relatively low cost.

While I have described the invention along specific lines, various minor changes or refinements may be made therein without departing from its principle, and I reserve the right to employ all such changes and refinements as may come within the scope and spirit of the appended claims.

I claim:

1. A lint trap for the moisture-discharge flue of a laundry drier comprising a housing interposed in said flue, a primary screen carried by the housing in the direct path of the flow from the drier to intercept lint and like material in said flow, and secondary screen means carried by the housing at points beyond said screen to catch such lint and other solid material as passes by said primary screen on the continuation of said flow through the housing, and a frame carried by the housing, said secondary screen means comprising a pair of converging screens in the path of flow from said primary screen, said frame including pairs of rods directed under the secondary screens and looped back over the upper sides thereof to form supporting receptacles for such screens.

2. A lint trap for the moisture-discharge flue of a laundry drier comprising a housing interposed in said flue, a primary screen carried by the housing in the direct path of the flow from the drier to intercept lint and like material in said flow, and secondary screen means carried by the housing at points beyond said screen to catch such lint and other solid material as passes by said primary screen on the continuation of said flow through the housing, said primary screen being V-shaped, said secondary screen means comprising a pair of screens located in the path of flow from said primary screen and converging toward each other, and a frame for supporting the primary and secondary screens as a unit, such frame comprising a medial rod carried by the housing, pairs of rods extending from the medial rod toward and under the sides of said primary screen for the support of the latter, and other pairs of rods extending from the medial rod under the secondary screens for the support of the same, such other pairs of rods being looped back over the upper sides of the secondary screens to form receptacles therefor.

References Cited in the file of this patent

UNITED STATES PATENTS

| | | |
|---|---|---|
| 568,735 | Bright | Oct. 6, 1896 |
| 986,599 | Sizer et al. | Mar. 14, 1911 |
| 1,355,761 | Jones | Oct. 12, 1920 |
| 1,641,102 | Slocum | Aug. 30, 1927 |
| 1,886,337 | Harnett | Nov. 1, 1932 |
| 1,926,433 | Cartmell | Sept. 12, 1933 |
| 2,403,416 | Vandegriff | July 2, 1946 |